Feb. 15, 1938.  A. BÜCHI  2,108,365
SLIDE VALVE CONTROLLED FOUR-STROKE CYCLE INTERNAL COMBUSTION ENGINE
Filed March 3, 1936  2 Sheets-Sheet 1
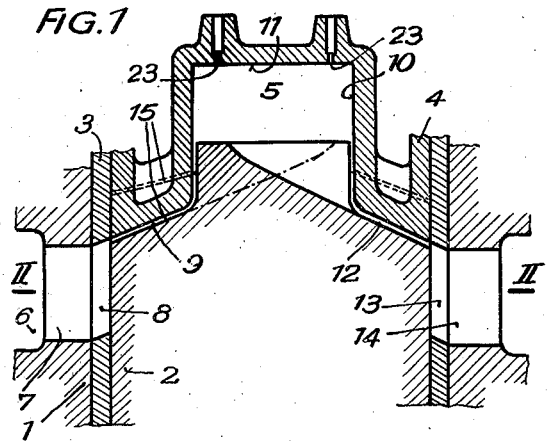
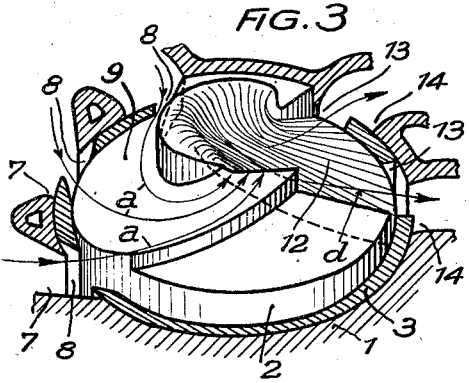
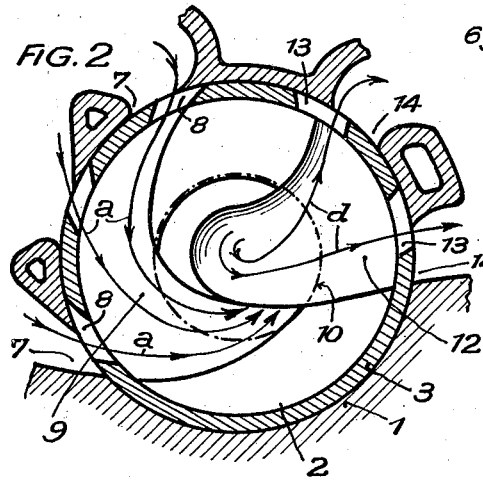
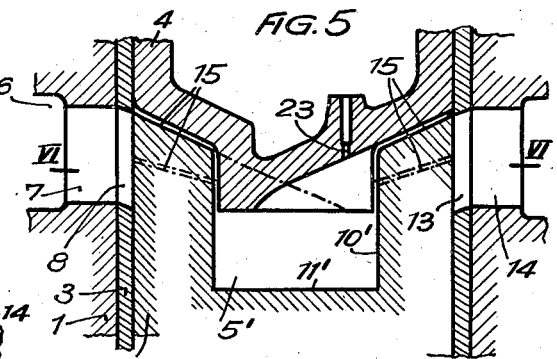
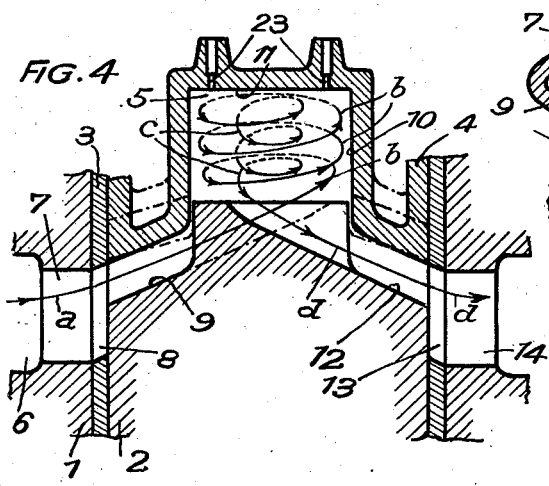
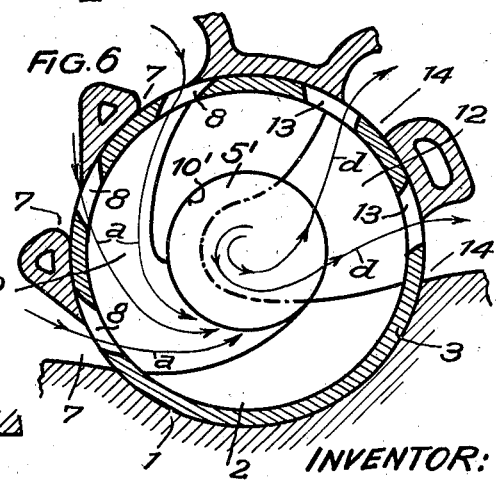
INVENTOR:
Alfred Büchi
By Sommers + Young
Attys.

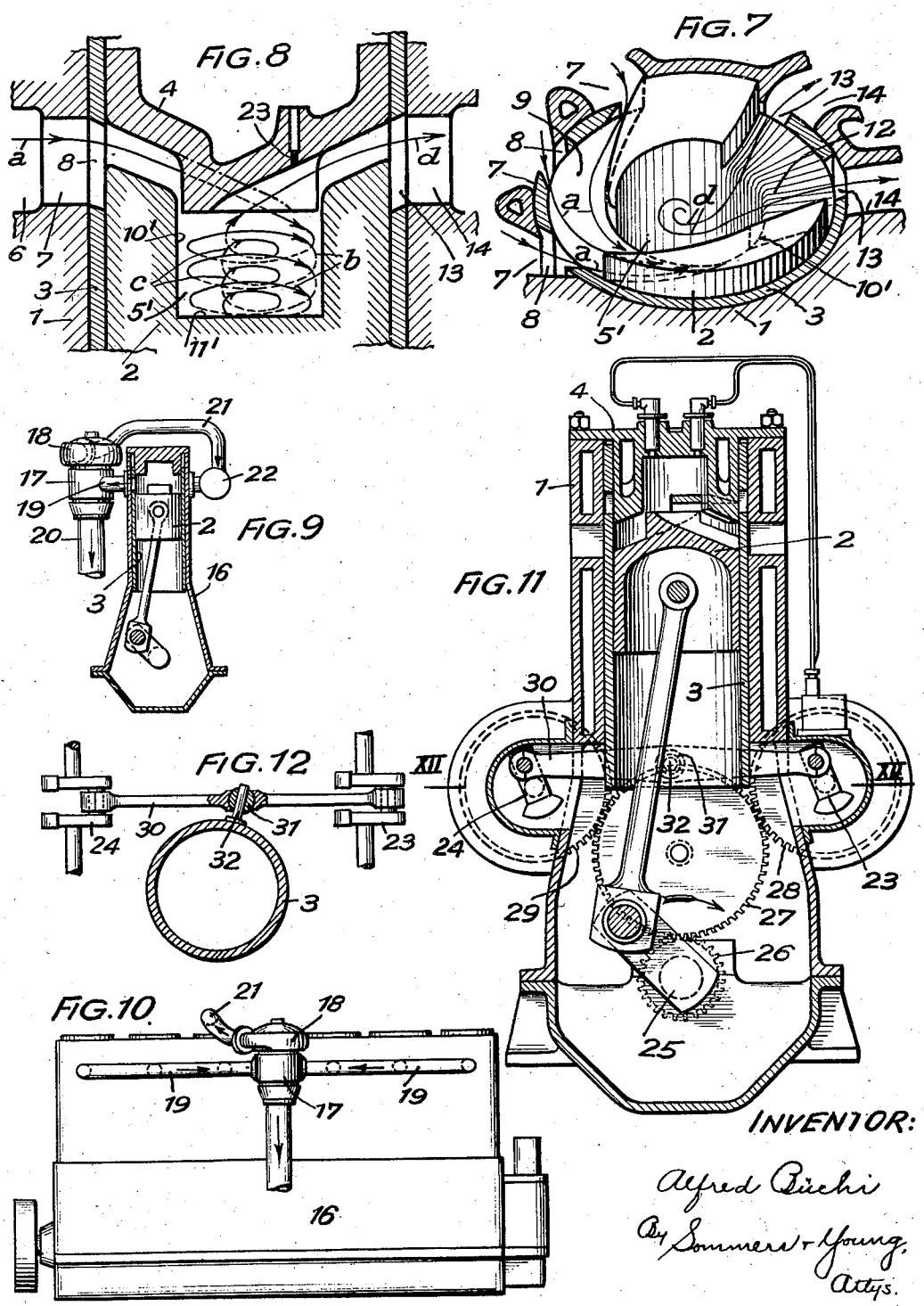

Patented Feb. 15, 1938

2,108,365

UNITED STATES PATENT OFFICE 2,108,365

SLIDE VALVE CONTROLLED FOUR-STROKE CYCLE INTERNAL COMBUSTION ENGINE

Alfred Büchi, Winterthur, Switzerland

Application March 3, 1936, Serial No. 66,962
In Switzerland March 6, 1935

2 Claims. (Cl. 123—32)

This invention relates to slide valve controlled four stroke cycle internal combustion engines.

The invention is particularly concerned with the construction of such engines that are supplied with precompressed charge and the working cylinders of which are scavenged.

The invention consists in shaping the wall portions of the cylinder space that guide the entering charge and the scavenging air, in such manner, that the charge and the scavenging air are each directed at least during the end portion of the upstroke of the piston tangentially of the exterior circumference of the combustion chamber, which is depressed longitudinally of the cylinder axis and the diameter of which is reduced relative to that of the piston, and from thence are passed in a helical movement of flow up to the end of the combustion chamber to impinge thereon and thereupon to return through the central portion of the combustion chamber towards the exhaust ports while maintaining the rotational movement of flow, the limiting wall portions of the cylinder space adjoining the exhaust ports for the spent gases being so shaped that the flow of gas passing out through the central portion of the combustion chamber is guided towards the exhaust ports in a way as not to be disturbed by the entering charge.

The flow of the entering and discharging gases may advantageously be improved by appropriately directing the ports in the valve slide and correspondingly shaping the portion of the cylinder guiding the flow at the entrance and at the exit. The flow of the entering charge may be guided by conically slanting the end surface of the piston towards the combustion chamber, whereas the flow of the discharging exhaust gases and scavenging air respectively is controlled, so as not to be disturbed by the flow arriving through the entrance, principally by recesses or the like in the piston that are shaped conformably to the direction of rotation of the discharging flow.

Furthermore, in order to avoid increasing the clearance space between the piston and the cylinder end beyond the combustion chamber, raised portions are provided on the end surface of the cylinder opposite the recessed points of the piston, so that a minimum permissible clearance between these parts is obtained. It will be understood that the amount of this clearance is so chosen at the points where the charge enters and at the points of discharge of the exhaust gases that but small resistances, i. e., losses of pressure and velocity accrue, in the flow of the entering charge and the flow of the discharging exhaust gases.

In the accompanying drawings two embodiments of the invention are schematically illustrated by way of example only, in which Fig. 1 shows a fragmentary section through the upper portion of a working cylinder and the associated piston of an internal combustion engine to which the invention is applied;

Fig. 2 shows a section along the line II—II of Fig. 1;

Fig. 3 is a sectional perspective view showing the outer end surface of the piston, the section being taken through the port openings of the cylinder and of the sleeve valve;

Fig. 4 shows a section similar to Fig. 1 in which the movements of flow of the charge and of the scavenging air respectively past the piston and through the combustion chamber in the cylinder end wall are indicated;

Fig. 5 shows a fragmentary section through the upper portion of a working cylinder and the associated piston of a second constructional form of an internal combustion engine to which the invention is applied;

Fig. 6 shows a section along the line VI—VI in Fig. 5;

Fig. 7 is a sectional perspective view of the upper end of the piston with the combustion chamber depressed therein, the section being taken through the ports of the sleeve valve of the engine;

Fig. 8 shows a section similar to Fig. 4 in which the movements of flow of the charge and of the scavenging air respectively past the cylinder end wall and through the combustion chamber in the piston are indicated;

Fig. 9 represents a sectional end elevation of an internal combustion engine, as illustrated in the Figs. 1 to 4, the section being taken through one of the working cylinders thereof;

Fig. 10 shows a side elevation of the engines as illustrated in the Figs. 1 to 4 and the Figs. 5 to 8;

Fig. 11 shows a transverse vertical section taken completely through the engine illustrated in the Figs. 1 to 4 in the middle of one of the working cylinders thereof to indicate also the drive of the sleeve valve, and Fig. 12 shows a section on the line XII—XII in Fig. 11.

Referring to the first constructional example of the internal combustion engine, as illustrated in the Figs. 1 to 4, the vertical section of Fig. 1 through the axis of one of its working cylinders shows the piston to assume its extreme outer end position. Fig. 4 shows the piston to occupy a different position from that shown in Fig. 1, namely, shortly before arriving at its outer dead centre or after having moved out of the same a small extent. The Figs. 1 to 4 show in fact all positions of the piston in which scavenging of the cylinder and particularly of the combustion chamber takes place. To this end the intake and exhaust ports of the sleeve valve are each shown in open condition in all of these figures.

1 designates the working cylinder, 2 the operating piston, 3 a cylindric sleeve valve encompassing the piston 2 and controlling the entrance of the charge and the discharge of the exhaust gases. 4 represents the end portion of the cylinder which in this case includes the combustion chamber in depressed position. The entering charge passes through a passage 6 into intake ports 7 ahead of the sleeve valve 3, and through corresponding ports 8 in the valve 3 into the working cylinder 1. The ports 8 are obliquely directed so as to impart to the entering charge a rotational movement of flow about the cylinder axis as indicated by the arrows a.

According to the invention, in the end surface of the piston 2 a recess 9 is provided. This recess extends only over that portion of the circumference where intake ports 8 are situated, the limiting walls of which being so directed that they impart to the entering charge, a movement of flow tangentially of the periphery 10 of the restricted combustion chamber 5, when the piston is positioned in the vicinity of its outer dead centre position. Furthermore, the end surface of the piston 2 and the oppositely disposed wall portions of the cylinder end portion 4 are so inclined, that the entering charge and the scavenging air respectively are guided to surely pass into the restricted combustion chamber 5 instead of into the larger cylinder space underneath as long as the piston assists in this guidance.

The charge is then deflected by the peripheral wall 10 of the restricted combustion space to pass on in a helical movement of flow (Fig. 4) up to the end wall 11 of the combustion chamber 5 most remote from the piston, as indicated by the arrows b, to return therefrom substantially through the central portion of the combustion chamber back to the piston while still maintaining its rotational movement of flow, as indicated by the arrows c.

In the end surface of the piston 2 a further recess 12 is arranged which receives the gases leaving the central portion of the combustion chamber 5 to guide them towards the exhaust ports 13 of the sleeve valve 3. This recess is, advantageously, also so shaped that the rotational movement of flow, as indicated by the arrows d, which was initiated on the entrance side, is maintained. Also the exhaust ports 13 of the sleeve valve 3 are advantageously shaped conformably to this movement. The latter parts pass on the exhaust gases to the exhaust ports 14 in the cylinder 1 from where they are further removed.

The end portion 4 of the cylinder is so shaped opposite the particular surface configurations of the cylinder end beyond the combustion chamber 5 that in the outer dead centre position of the piston that at all the respective surface portions but a minimum permissible clearance space 15 is left. The end portion of the cylinder thus confines the piston end, advantageously, as completely as possible.

In Fig. 5 a vertical section through the axis of the combustion chamber of the second constructional example of the internal combustion engine, according to the invention, is shown.

Fig. 8 shows the piston of this constructional example in a position somewhat spaced from the dead centre position. This constructional example, which is represented in the Figs. 5 to 8 differs from that shown in the Figs. 1 to 4 by the restricted combustion chamber being depressed in the piston 2 of the engine. The peripheral portion of the piston end surface slants radially inwardly conformably to the corresponding portion of the inner surface of the cylinder end portion 4. The entering charge passes into the restricted combustion chamber 5' in the direction of the arrows a. Since the charge impinges thereat in a tangential and downwardly inclined direction, it thereupon assumes a helical downwardly directed movement of flow b, as clearly shown in Fig. 8, to subsequently impinge on the bottom 11' of the combustion chamber and then, by continuing to turn in the same direction, forms inner helical return convolutions c back to the cylinder end portion to pass to the exhaust ports 13 in the sleeve valve 3 and the exhaust ports 14, as indicated by the arrows d. The end surface of the piston and the surface of the cylinder end portion 4 overlying the same are, in this case also, so shaped that in the dead centre position only a minimum clearance 15 exists between these two ports, as evident from Fig. 5. The chain dotted lines shown in this figure are for indicating the minimum amount of play left between the mating raised and recessed surface portions on the cylinder and piston ends respectively.

The Figs. 9 and 10 represent an end and a side elevation respectively of an engine to which the invention is applied. By 16 the internal combustion engine as such is designated, whereas 17 refers to the exhaust driven machine and 18 to a charging and scavenging air blower. The exhaust gases pass out through the sleeve valves 3 to be admitted to the exhaust driven machine 17 through conduits 19 and are then led downwardly to escape at 20.

The charging and scavenging air, however, passes from the blower 18 to the entrance side of the sleeve valve 3 through conduits 21 and 22. The sleeve valve 3 is shown in Fig. 9 to open only into the exhaust conduit. The scavenging operation has not yet begun at this moment. The charging and scavenging blower or blowers respectively may obviously also be mechanically driven by the internal combustion engine or else from a separate source of power. The internal combustion engine may be of any suitable type. The drive of the sleeve valve is not shown in Fig. 9, but may, if desired, be effected in the same manner as shown in Fig. 11.

In the Figs. 11 and 12 a constructional example of the drive of the sleeve valve is shown. Fig. 11 represents a vertical section through the axis of the cylinder, whereas Fig. 12 is a horizontal section through the lower end of the slide valve. A pair of cranks 23 and 24, which is actuated from the main shaft 25 of the engine, imparts to the sleeve valve 3 a combined movement about the cylinder axis and longitudinally thereof at the same time, by means of a connecting rod 30 and a guide stud 32 connected to the latter by means of a ball joint 31, so that the sleeve valve is adapted to open and close the exhaust and intake ports at the proper time.

Naturally any suitable types of slide valves and drives therefor may be employed.

In Fig. 11, the valve slide 3 is shown in a position in which it does not open either the exhaust or the intake ports. The piston forces during the end portion of its compression stroke the charge into the restricted combustion chamber in a direction tangentially of the latter and thus imparts to the charge an impulse of rotational movement shortly before the ignition takes place.

By means of the invention it is possible to scavenge and supply respectively with fresh charging air the combustion chamber 5 or 5' of a slide valve controlled internal combustion engine of the type described. The combustion chamber is thereby not only filled with fresh cold air, but in addition its walls are cooled interiorly. The jet of cold air arrives first at these hot walls and the air thus preheated then passes out through the central portion of the combustion chamber towards the exhaust ports.

Furthermore, by effect of the described irregularly stepped off shape of the piston, as regards the cylinder axis, once more a vigorous rotational movement of flow advancing in the direction of the cylinder axis is imparted to the content of the working cylinder in which way the air, which is displaced laterally beyond the combustion chamber 5', is guided onto the periphery of the combustion chamber 5', in a similar manner as during the charging and scavenging operation, and is imparted thereat a rotational movement of flow. By effect of this rotational movement of flow of the combustion air advancing towards the entering fuel, which is admitted to the combustion chamber through one or more apertures 23, is divided in an improved manner, so that even with a minimum surplus amount of air, a still more perfect combustion than usual is obtained.

Various changes may be made from the embodiments of the invention, as shown. In any case it is, however, indispensable that the desired end is obtained, namely, that either the restricted combustion chamber 5 or 5' is charged and scavenged in the improved manner explained, or that the vigorous turbulence of the air sets in at the beginning of the fuel injection, or both. It will be seen that the invention can also be applied to double acting internal combustion engines.

The embodiments of the invention shown in the Figs. 1 to 8 operate by compression ignition. The fuel is injected into the combustion chamber through the passages 23 in known manner. It will be observed that the invention can also be applied to internal combustion engines operating with artificial ignition. In this case it is, however, necessary to provide that during the actual scavenging of the combustion chamber and the cylinder only pure air instead of a mixture is introduced.

What I claim is:

1. In a four-stroke cycle slide valve controlled internal combustion engine, a working cylinder having a closed end, a working piston in said cylinder cooperating with said cylinder end with its adjacent end, one of said ends having an axially extending bore of less diameter than the cylinder and constituting a combustion chamber, a slide valve in said cylinder surrounding said piston, said valve and cylinder having registerable intake and exhaust ports, and mating surface configurations on said cooperating piston and cylinder ends extending from the intake valve ports angularly around the piston and cylinder ends, and inwardly to the combustion chamber, forming near the top dead center position of said piston a guiding passage for the entering charge and scavenging air, which passage opens into the combustion chamber substantially tangentially for producing a helical flow of fluid into said chamber, said piston and cylinder ends also having substantially mating channel-shaped surface configurations extending from a central portion of the combustion chamber outwardly to the exhaust ports forming near the top dead center position of the piston an exhaust passage in contiguity with said helical flow, whereby the helical flow of fluid is reflected by the bottom of said bore axially of the combustion chamber to the exhaust passage and thence passes to the exhaust valve ports.

2. In a four-stroke cycle slide valve controlled internal combustion engine, a working cylinder having a closed end, a working piston in said cylinder cooperating with said cylinder end with its adjacent end, said cylinder end having an axially extending bore of less diameter than the cylinder and constituting a combustion chamber, a cylindrical slide valve in said cylinder surrounding said piston, said valve and cylinder having registerable intake and exhaust ports, said piston having an axially projecting extension of less diameter than the piston mating with said bore of said cylinder, and mating surface configurations on said piston end and projecting extension and said cylinder end extending from the intake valve ports angularly around the piston and cylinder ends, and inwardly to the combustion chamber, forming near the top dead center position of said piston a guiding passage for the entering charge and scavenging air, which passage opens into the combustion chamber substantially tangentially for producing a helical flow of fluid into said chamber, said piston end and extension thereof and cylinder end also having mating surface configurations, comprising a recess formed in the central portion of the piston extension and a passage having outwardly diverging walls extending from said recess outwardly and axially to the exhaust ports, forming near the top dead center position of the piston an exhaust passage in contiguity with said helical flow, whereby the helical flow of fluid is reflected by the bottom of said bore axially of the combustion chamber to the exhaust passage and thence passes to the exhaust valve ports.

ALFRED BÜCHI.